C. B. WISER.
Coupling-Joint for Oil-Well Drills.
No. 161,082.          Patented March 23, 1875.
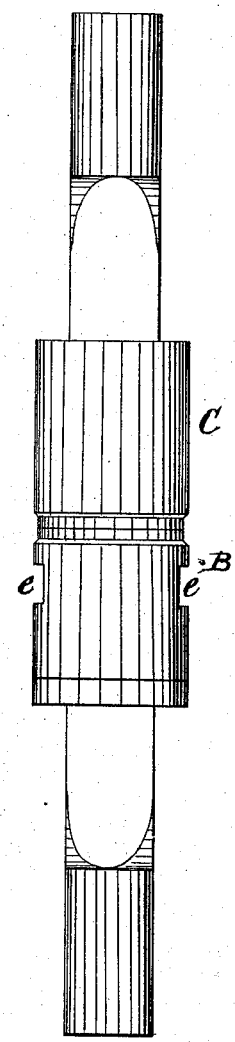
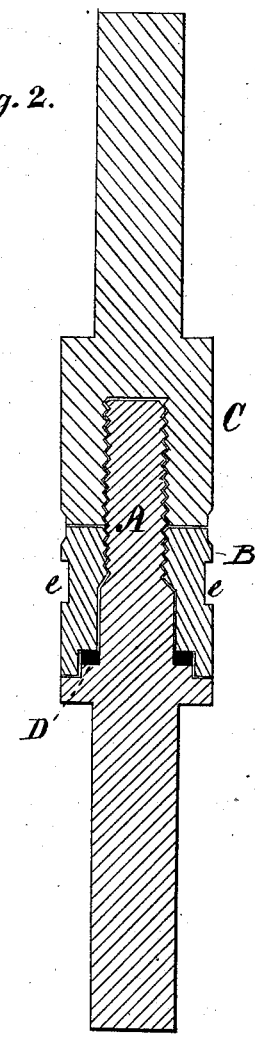

UNITED STATES PATENT OFFICE.

CLINTON B. WISER, OF BUTLER, PENNSYLVANIA.

IMPROVEMENT IN COUPLING-JOINTS FOR OIL-WELL DRILLS.

Specification forming part of Letters Patent No. 161,082, dated March 23, 1875; application filed September 9, 1874.

*To all whom it may concern:*

Be it known that I, CLINTON B. WISER, of Butler, in the county of Butler and State of Pennsylvania, have invented a new and useful Improvement in Joints for Tools for Oil and other Wells; and I do hereby declare that the following is a full and exact description thereof, reference being had to the accompanying drawings, and to the letters of reference marked thereon.

My invention relates to an improvement in joints for tools used for boring deep wells, such as oil, salt, or artesian wells; and consists in constructing the upper end of the screw-pin of steel, and providing it with a nut having a recess for the reception of an elastic packing at the base of the pin.

To enable others skilled in the art to make and use my invention, I will proceed to describe its construction and operation.

In the accompanying drawings, Figure 1 is a side elevation of my improved joint for drilling-tools for wells. Fig. 2 is a vertical section of the same.

In the drawings, A represents the screw-pin, the upper end of which is constructed of steel, and is provided with a nut, B, in the lower end of which is a recess for an elastic packing, as indicated at D. C represents the screw-box of an auger-stem, sinker-bar, jars, or rope-socket of tools used for drilling wells. The upper end of the screw-pin A is dressed to a horizontal plane, and the inner end of its chamber is also dressed to a horizontal plane, so that when the screw-pin A is screwed into the screw-box C the end of the pin will rest against the end of its chamber. The nut B is then rotated until it firmly clamps the screw-box C on the pin A.

The elastic packing D is for the purpose of preventing sand or other gritty material working into the joints.

By constructing the upper end of the screw-pin A of steel, it will prevent it from becoming jammed or upset, and by having its end dressed to a horizontal plane, and the two parallel surfaces brought together and clamped in position through the medium of the clamping-nut D, constructed as described, the jarring force of the tools is thrown on the end of the screw A and the inner end of its chamber, whereby the staving up of the joint and the breaking off of the screw-pin are effectually avoided.

The recesses e in the nut B are for the reception of the wrench used for operating the nut.

I am aware that a patent was granted to R. M. Pattee, for coupling water-pipes, under date of March 8, 1870, and numbered 100,665; and I wish it to be understood that I do not claim the invention therein shown.

Having thus described the nature, construction, and operation of my improvement, what I claim as of my invention is—

The pin A, the point of which is constructed of steel, and provided with a nut having a recess in its lower end for the reception of the elastic packing at the base of the pin, said pin, nut, and packing-ring combined with the screw-box of the auger-stem, constructed substantially as hereinbefore described, and for the purpose set forth.

CLINTON B. WISER.

Witnesses:
  A. C. JOHNSTON,
  JAMES J. JOHNSTON.